Sept. 29, 1936.　　　　W. W. SHIGLEY　　　　2,055,777
CHANGEABLE LIGHT ADVERTISING DEVICE
Filed April 24, 1935　　　2 Sheets-Sheet 1
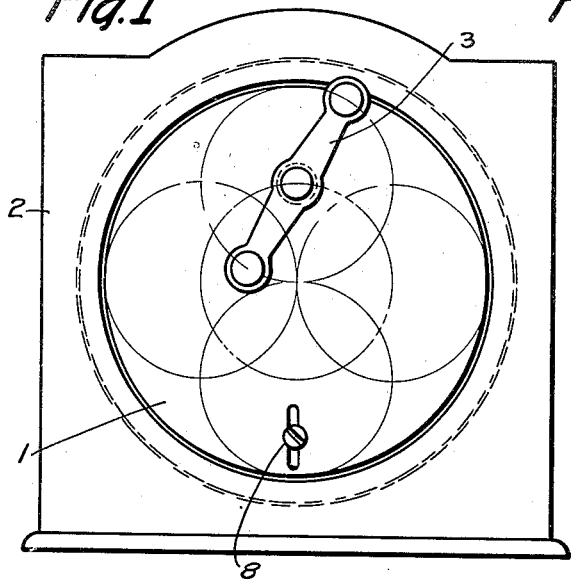
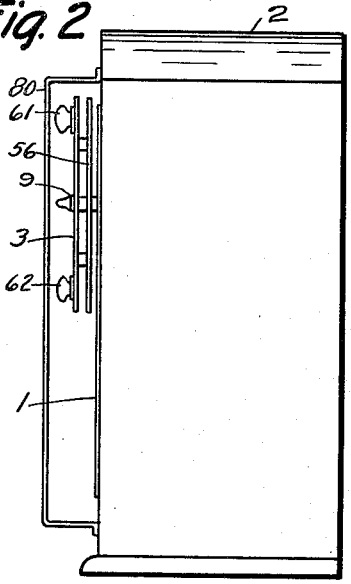
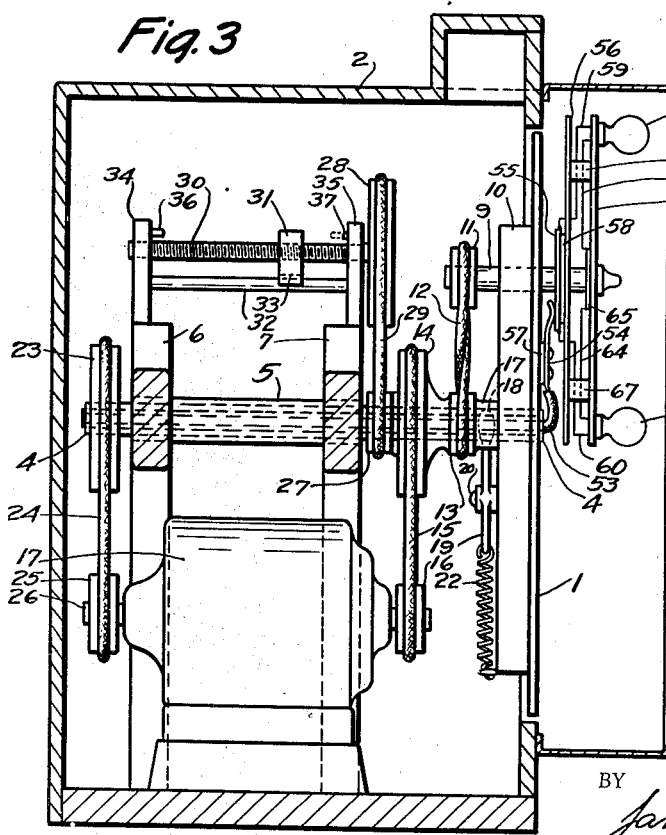
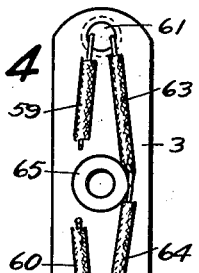
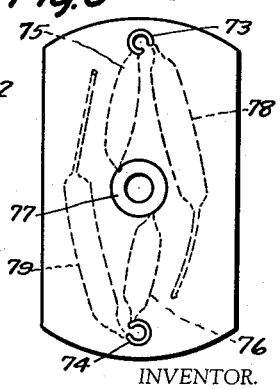
INVENTOR.
*William W. Shigley*
BY
*James Harrison Bowen*
ATTORNEY.

Sept. 29, 1936. W. W. SHIGLEY 2,055,777
CHANGEABLE LIGHT ADVERTISING DEVICE
Filed April 24, 1935 2 Sheets-Sheet 2

INVENTOR.
William W. Shigley
BY
James Harrison Bowen
ATTORNEY.

Patented Sept. 29, 1936

2,055,777

UNITED STATES PATENT OFFICE 2,055,777

CHANGEABLE LIGHT ADVERTISING DEVICE

REISSUED

William W. Shigley, Brooklyn, N. Y., assignor of one-half to Dr. C. Abbott Bush, Brooklyn, N. Y.

Application April 24, 1935, Serial No. 18,002

11 Claims. (Cl. 240—10.1)

The purpose of this invention is to provide an advertising device that attracts attention, in which means is provided for moving two lights with a rotary motion so that they form different figures and automatically change from one to the other, thereby providing a continuously operated sign which is continually changing.

The invention is a plurality of lights rotatable on a disc in which the disc is also rotatable, and in which the disc and lights rotate in opposite directions and at different speeds, thereby providing different designs automatically changing from one to another.

It is appreciated that many devices have been provided of this nature in which lights are rotatably mounted on a disc and these devices have been used for various purposes, however, the mechanism required has heretofore been of such a nature that these devices are impracticable for ordinary display advertising and, therefore, this invention relates to improvements in the mechanism of devices of this nature by which they are operated, and these improvements are such that the device will operate continuously and economically with the speeds of the different parts variable and with the direction of rotation constantly reversing so that many different designs are automatically obtained in sequence. Such a device has many advantages from an advertising point of view as when used in combination with a sign for window display, particularly at night, the continually changing designs will attract a great deal more of attention than any flasher or different movements in parts of a constant design.

The object of the invention is, therefore, to provide a changeable light advertising device which automatically operates continuously and in which the mechanism is relatively simple and inexpensive.

Another object is to provide a display device having lights rotatable about a center, in which the direction of rotation is automatically reversed.

Another object is to provide a rotating member having another member rotatable thereon, in which the varying speed of the two members may be controlled by a brake operated by the centrifugal force thereof.

A further object is to provide means for rotating a plurality of lights to obtain different designs in which all the mechanism is automatic and contained in a relatively simple casing.

And a still further object is to provide a changeable light advertising device in which the lights automatically create different designs, which is of a simple and economical construction.

With these ends in view, the invention embodies a rotatable disc mounted in a suitable arm, a frame rotatable on said disc and adapted to rotate in a direction opposite to that of the disc, lights on the ends of said arm, means providing current through said lights, a motor with suitable connections to rotate said disc and arm, means varying the speed of one member in relation to that of another, and means reversing the direction of rotation of said motor automatically.

Other features and advantages of the invention will appear from the following description taken in connection with the drawings, wherein:

Figure 1 is a view showing a front elevation of the device.

Figure 2 is a view showing a side elevation of the device.

Figure 3 is a view showing a cross section through the device with parts broken away and parts omitted.

Figure 4 is a detail showing the back of the arm rotatable on the disc.

Figure 5 is a similar view looking toward the front of the arm showing an alternate design in which neon lights are used and the electrodes therefor are shown in dotted lines on the back of the arm.

Figure 6:
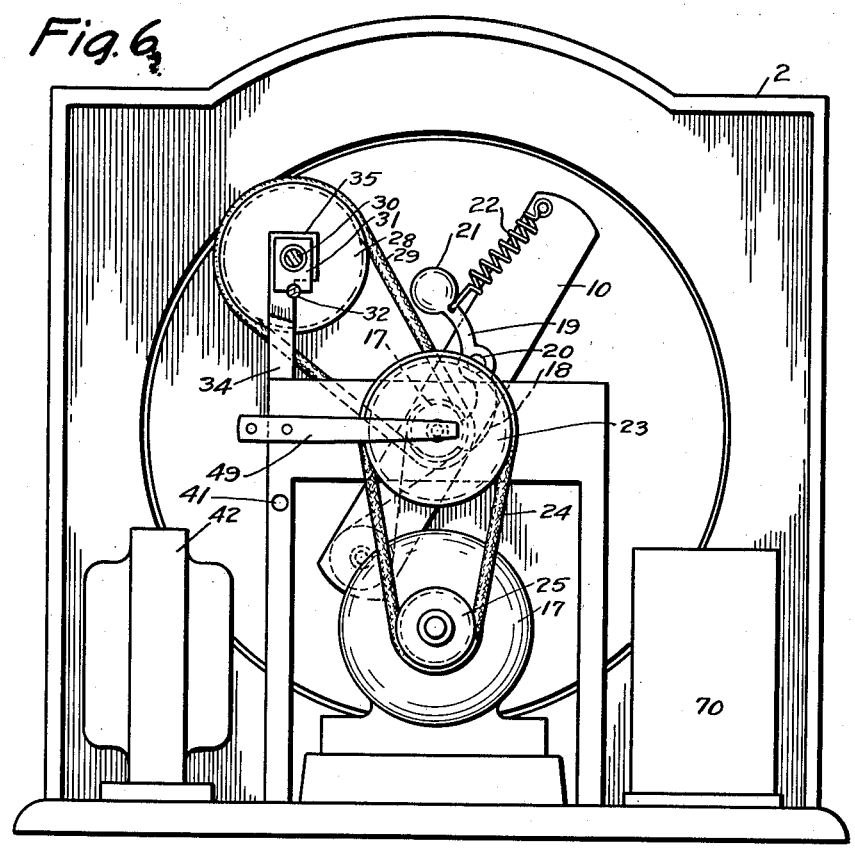
Figure 6 is a view looking toward the rear of the casing with the casing shown in section and with parts omitted.
Figure 7:
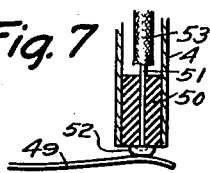
Figure 7 is a detail showing the end of a contact arm at the inner end of the main shaft.

In the drawings the device is shown as it may be made, wherein numeral 1 indicates the disc, numeral 2 the casing, and numeral 3 the small arm rotatable on the disc 1.

The disc 1 is fixedly mounted on a tubular shaft 4, and this is held in a tube 5 in a frame formed by the supporting members 6 and 7. The arm 3 is mounted on one side of the disc 1 and the other side may be provided with a counterweight held by a screw 8 in a slot so that the position thereof may be adjusted to compensate for the weight of the arm 3.

The arm 3 is mounted upon a shaft 9 which is rotatably mounted in the disc 1 and it will be noted that the disc is provided with a reinforcing bar 10 which provides suitable bearings and also additional counterweight for the arm 3. On the inner end of the shaft 9 is a pulley 11 which is driven by a cross belt 12 from a pulley 13 that is made integral with a larger pulley 14 and the pulley 14 is driven by a belt 15 from a pulley 16 on a motor, as shown. The pulleys 13 and 14 are freely mounted on the tubular shaft 4 so that as the motor is started it rotates the pulley 14 through the belt 15 and this pulley rotates the pulley 13 which rotates the shaft 9 through the belt 12 thereby causing the arm 3 to rotate on the disc 1. The pulley 13, however, is provided with a sleeve 17 positioned between the pulley and the member 10 and this sleeve is engaged by a shoe 18 on an arm 19 that is pivotally mounted on the member 10 by a pin 20, and the outer end of the arm 19 is provided with a counterweight 21 and resiliently held upward by a spring 22. Therefore, as the pulley 13 rotates, the friction between the shoe 18 and the sleeve 17 will cause the disc 1 to rotate and as the speed of this disc accelerates it will throw the weight 21 outward by centrifugal force, and this will hold the shoe 18 against the sleeve 17 with greater force so that the speed of the disc 1 will increase, however, as the belt 12 is crossed this will rotate in an opposite direction to that of the arm 3.

In the design shown in Figure 3 the opposite end of the tubular shaft 4 is also provided with a pulley 23 which is driven by a belt 24 from a pulley 25 also on the motor shaft which is indicated by the numeral 26, however the pulley 25 is of a different size than the pulley 16 so that although both of these pulleys are rotated by the same motor and at the same speed they will drive the pulleys 23 and 14 at different speeds, with the speed of the pulley 23 slightly greater than that of the pulley 14, and with the pulley 23 fixedly mounted on the end of the shaft 4, the disc 1 will be positively rotated, thereby providing a positive variable drive. The belt 24 may however be omitted so that the disc 1 is driven through the arm 19 for more simple designs, and both the belt and the arm are normally provided so that one may readily change from one to the other. Another pulley 27 is also made integral with the pulley 14 and this drives a pulley 28 through a belt 29 and the pulley 28 is mounted on the end of a screw 30 having a nut 31 mounted thereon, and the nut engages a bar 32 through a recess 33 in the under side thereof, so that it may be held and as the screw 30 is rotated, the nut 31 will move back and forth between the extensions 34 and 35 of the members 6 and 7. These extensions are provided with pins 36 and 37 representing buttons of switches installed in the extensions and connected in the motor circuit and as the nut 31 engages these pins they will reverse the motor so that the nut will start back in the opposite direction at the same time the direction of rotation of the members 1 and 3 will be reversed. Any suitable reversing switch adapted to be operated by a moving element of the device may be employed, and the showing made in Figure 3 is intended merely to suggest one of the possible arrangements.

It will be understood, however, that any means may be used for reversing the directions of these members and this may be operated in any manner.

Figure 8:
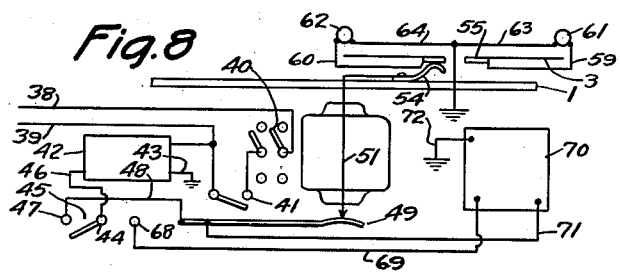
Figure 8 is a view showing a wiring diagram.

Although it is understood that electrical connections may be provided in any manner, a diagram is shown in Figure 8 to show that these connections are possible with the members rotating as shown and described. In this diagram current is supplied through wires 38 and 39 which are connected to a double-throw switch 40 of the motor, with a switch 41 in which the wires 38 and 39 are connected and these wires may also be connected to the primary winding of a transformer 42.

The switch 41 may be used as the starting switch and the switch 40 shown in Fig. 8 may represent the switches in the extensions 34 and 36, which are operated by the buttons 36 and 37 shown in Figure 3. The secondary winding of the transformer 42 is grounded to the frame, as shown at the point 43 and the opposite terminal thereof is connected to the central terminal 44 of a double-throw switch 45 through a wire 46. One of the other terminals 47 of the switch 45 is connected by a wire 48 to a brush 49 that engages the end of the wire extending through the shaft 4 and the end of the tube is formed with a fibre bushing 50 through which a wire 51 extends with a cap 52, on the outer end thereof. The wire 51 extends through the center of the shaft 4 and the opposite end is connected by a wire 53 to a brush 54 on the disc 1 and this brush engages a disc 55 on the back of an auxiliary arm 56 which is located between the arm 3 and the disc 1. The arm 54 is insulated from the disc 1 by a member 57 and the disc 55 is insulated from the member 56 by a member 58. The member 55 is connected by wires 59 and 60 to the lights 61 and 62 on the ends of the arm 3. The opposite terminals of these lights are grounded to the frame through the shaft 9 and the disc 1 by wires 63 and 64 which are connected to a disc 65 on the back of the arm 3, and this disc fits against the shaft 9. The member 56 is connected to the arm 3 by posts 66 and 67 as shown in Figure 3. The circuit is, therefore, completed from the brush 49 through the wire 50 to the brush 54 and from this brush through the disc 55 and wires 59 and 60 to the lights 61 and 62 and these are grounded through the wires 63 and 64.

When it is desired to use neon lights, the switch 45 is thrown in the opposite direction with the arm engaging the terminal 68 and this is connected by wires 69 to the primary winding of a coil 70 and the high tension or secondary of the coil is connected by a wire 71 to the brush 49. The coil is grounded as shown at the point 72. This will provide a complete circuit through neon lights used in place of lights 61 and 62. It will be understood, however, that connections to the neon lights may be provided in any manner or by any means. In the design shown in Figure 5, in which the neon lights are indicated by the numerals 73 and 74, these are connected by electrodes 75 and 76 to a disc 77 similar to the disc 55 and also through electrodes 78 and 79 to the disc 58, thereby completing a circuit through the electrodes.

The casing 2 may be made as shown or may be of any shape or design and may be provided with suitable advertising space around the lights or advertisements may be used in combination therewith, as may be desired. A guard member 80 which may be made of wire, mesh or transparent material, may be placed over the lights as shown, if desired, however it will also be understood that this may be omitted.

Figure 9:
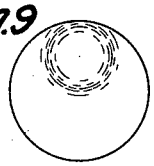
Figures 9 to 14 show a plurality of different designs obtainable by operating the lights in different directions and at different speeds with normal electric lights as shown in Figure 4.
Figure 10:
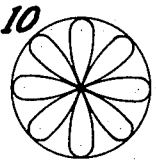
Figure 11:
Figure 12:
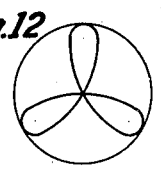
Figure 13:
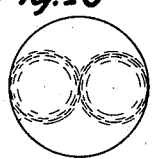
Figure 14:
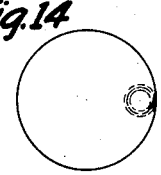

When this device is first started, there will be two distinct circles, as shown in Figure 9, and if one light is red and the other green, one of these circles will be red and the other green, and these will be fused together as the speed changes. As the speed increases, a design, as shown in Figure 10, will be provided and the alternate loops will be red and green, and from this design the lights will produce a distinct cross as shown in Figure 11, with one member red and the other green. As the speed increases the lights will produce a design shown in Figure 12, with the red and green fused throughout the lines thereof, and with the speed again increasing, two distinct circles will be produced, as shown in Figure 13, with one green and the other red. These circles will have the appearance of travelling around each other, and as the speed is again increased, the lights will produce a design as shown in Figure 14, with the red and green lights fused together and from the small loop in one side of the circle, the design will go back to that shown in Figure 1, as the motor is reversed and the sequence of designs will again be produced.

Figure 15:
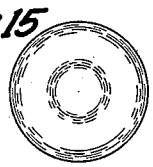
Figure 15 is a view showing one effect that is produced by the neon lights.

With the neon lights two distinct red and green circles, with one larger than the other, will be produced as shown in Figure 15, however these circles will be broken as the lights are extinguished for an instant with the making and breaking in the coil. Variated designs are also produced with speeds of red and green lights between the two circles, as shown in Figure 15. Other designs may be produced by using different speeds if desired.

It will be understood that other changes may be made in the construction without departing from the spirit of the invention. One of which changes may be in the use of a different number of lights, another may be in the use of other means for mounting and driving the disc and arm, and still another may be in the use of other means for changing the speed of the respective parts.

The construction will be readily understood from the foregoing description. In use the device may be provided as shown and described and, as hereinbefore stated, it may be provided with suitable advertising matter or used in combination with signs or displays or the like where it is desired to call attention to the advertising or displays, and the parts may be made in different sizes or the proportions of one part in relation to the other may be changed or the entire device may be made large or small as may be desired. As the switch is turned on the motor will start at a relatively low speed and immediately produce the design shown in Figure 9, and as the speed is increased it will produce the different designs in the order shown. When these designs have been produced, the nut 31 will reach the opposite end of the screw 30 and operate the switch to reverse the motor so that the same designs may be produced with the motor travelling in the opposite direction.

It will be noted that whereas the machine is provided with both of the belts 15 and 24, the belt 15 is only used normally, as when the belt 24 is used, a constant speed is obtained, and this produces one design only. By changing these speeds it is possible to obtain any one of the designs, or any one of many other designs and produce this design continuously; however the most effective results are obtained with the belt 24 omitted, as this makes it possible to produce variations in speed, and these speeds produce continually changing designs. This also provides an intermittent drive, as it rotates first in one direction and then in the other, and it will be appreciated that the length of time the device travels in either direction may readily be regulated. It may also be possible to run the large disc at a constant speed and only stop and start the small disc or vice versa. Therefore with the particular arrangement of the parts of this device it is possible to obtain a relatively large number of combinations of designs and movements.

Having thus fully described the invention, what I claim as new and desire to secure by Letters Patent is:

1. A changeable light operating device consisting of a relatively large disc, an arm rotatably mounted on the large disc and positioned on one side of the center lights on the ends of said arm, means connecting said lights to a source of electric current through said device, a shaft upon which the large disc is mounted, said shaft being freely mounted to permit rotation thereof, rotating means rotatably mounted on said shaft, a motor adapted to rotate said rotating means, means rotating said arm by said rotating means on the shaft the rotation of said arm adapted to cause said large disc to rotate, and means on said large disc engaging said rotating means causing said large disc to rotate thereby by friction.

2. A device as described in claim 1 characterized in that the means on said large disc engaging said rotating means on the shaft comprises an arm pivotally mounted on said disc with one end engaging the surface of said rotating means and provided with a counter-weight on the opposite end with resilient means holding said counter-weight outward and with the outward movement of said counter-weight adapted to be accentuated by the centrifugal motion of said disc.

3. A changeable light operating mechanism of the type having two lights rotatably mounted in an eccentric position on a larger rotating member characterized in that the large rotating member is freely mounted and not positively driven and also in that positive means is provided for rotating the two lights.

4. A device as described in claim 3 characterized in that means is provided on said larger rotating member for frictionally engaging the means rotating the lights.

5. A device as described in claim 3 characterized in that means is provided on said larger rotating member for frictionally engaging the means rotating the lights, and also in which the pressure of the friction engaging means is increased as the speed of the large rotating member increases.

6. A changeable light advertising device of the type having two lights rotatably mounted and eccentrically positioned on a relatively large rotating member characterized by a shaft upon which said large rotating member is mounted, means freely mounting said shaft permitting rotation thereof, a pulley rotatably mounted on said shaft, a motor adapted to drive said pulley, another pulley on the rotatably mounting means of of said lights, means driving the pulley of the lights by the pulley on the shaft of the large rotating member, and means on said large rotating member frictionally engaging one end of the pulley on the shaft upon which it is mounted.

7. A device as described in claim 6 further characterized in that the friction engaging means comprises an arm pivotally mounted on said large rotating member with the inner end engaging the end of the pulley, and with a weight on the outer end adapted to be thrown outward by centrifugal force as the said large member rotates, thereby increasing the friction at the inner end.

8. An advertising device of the type having rotary lights, a rotating member, means freely mounting said rotating member permitting rotation thereof, a plurality of lights rotatably mounted on said rotating member and positioned toward one side thereof, means rotatably mounting said lights on said rotating member, means driving said lights, and means mounted on said former rotating member and adapted to engage the driving means of said lights forming a brake between the rotating member and lights.

9. A device as described in claim 8 characterized in that the means mounted on the rotating member engaging the rotating means of the lights is resiliently held out of engagement and forced into engagement with the rotating means by centrifugal motion.

10. An advertising device as described in claim 8 characterized in that means is provided for reversing the direction of rotation of the parts.

11. An advertising device as described in claim 8 characterized in that means is provided for bringing the rotating parts substantially to a stop at regular intervals.

WILLIAM W. SHIGLEY.